(12) United States Patent
Shomura et al.

(10) Patent No.: US 10,666,557 B2
(45) Date of Patent: May 26, 2020

(54) METHOD TO MANAGE DATA FLOW FOR EDGE-CORE DISTRIBUTED ANALYTICS SYSTEMS

(71) Applicant: Hitachi, Ltd., Tokyo (JP)

(72) Inventors: Yusuke Shomura, Los Gatos, CA (US); Joydeep Acharya, Milpitas, CA (US); Sudhanshu Gaur, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 188 days.

(21) Appl. No.: 16/054,930

(22) Filed: Aug. 3, 2018

(65) Prior Publication Data

US 2020/0044961 A1    Feb. 6, 2020

(51) Int. Cl.
*G06F 15/173* (2006.01)
*H04L 12/721* (2013.01)
*H04L 12/24* (2006.01)
*H04L 12/813* (2013.01)
*H04L 29/06* (2006.01)
*H04L 29/08* (2006.01)

(52) U.S. Cl.
CPC .............. *H04L 45/38* (2013.01); *H04L 41/22* (2013.01); *H04L 47/20* (2013.01); *H04L 65/80* (2013.01); *H04L 67/12* (2013.01)

(58) Field of Classification Search
CPC ......... H04L 45/38; H04L 41/22; H04L 47/20; H04L 65/80; H04L 67/12
See application file for complete search history.

(56) References Cited

U.S. PATENT DOCUMENTS

| | | | |
|---|---|---|---|
| 2007/0094712 A1* | 4/2007 | Gibbs | H04L 47/20 726/3 |
| 2011/0185082 A1* | 7/2011 | Thompson | H04W 4/60 709/238 |
| 2015/0207724 A1* | 7/2015 | Choudhury | H04L 41/12 370/255 |
| 2016/0094398 A1* | 3/2016 | Choudhury | H04L 45/42 370/254 |
| 2016/0294682 A1* | 10/2016 | Bi | H04W 76/12 |
| 2017/0237863 A1 | 8/2017 | Frydman et al. | |
| 2017/0277521 A1* | 9/2017 | Sharma | G06F 16/9535 |
| 2017/0344943 A1* | 11/2017 | Herrin | G06Q 30/0217 |
| 2018/0049179 A1* | 2/2018 | Shah | H04L 67/12 |
| 2018/0167445 A1 | 6/2018 | Speight et al. | |
| 2019/0226868 A1* | 7/2019 | Hazrati | G08G 1/0145 |
| 2019/0349426 A1* | 11/2019 | Smith | H04L 69/22 |
| 2020/0044961 A1* | 2/2020 | Shomura | H04L 45/38 |

FOREIGN PATENT DOCUMENTS

WO    2017/035536 A1    3/2017

OTHER PUBLICATIONS

Extended European Search Report for related European Application No. 191592492, dated Oct. 16, 2019; 7 pages.

* cited by examiner

*Primary Examiner* — Jonathan A Bui
(74) *Attorney, Agent, or Firm* — Procopio, Cory, Hargreaves & Savitch LLP

(57) ABSTRACT

This invention aim to improves the flexibility of data flows management from sensor to cloud, datalake or other system, which can manage the overall data flows within the system and control them dynamically. As a result, it can reduce transmission cost and storage cost properly.

18 Claims, 13 Drawing Sheets

| # | User ID | git | | |
|---|---|---|---|---|
| | | Domain Name | Username | Access Token |
| 1 | User01 | github.com | User01 | axcg43sdgxch |
| 2 | | | | |
| 3 | | | | |
| 4 | | | | |
| 5 | | | | |
| 6 | | | | |
| | | | | |
| | | | | |

FIG. 5

| # | Channel ID | | Message Format | Message Definition | | | | |
|---|---|---|---|---|---|---|---|---|
| | Index | Type | | Git URL | Branch | IDL File Path | Message Name | File URL |
| 1 | sensor | current | JSON | - | - | - | - | - |
| 2 | sensor | vib | Protobuf | git.com | master | path/to | vibration | pb-02.tar |
| 3 | | | | | | | | |
| 4 | | | | | | | | |
| | | | | | | | | |
| | | | | | | | | |
| | | | | | | | | |
| | | | | | | | | |

FIG. 6

| # | Channel ID | Routing Rule | | |
|---|---|---|---|---|
| | | Transmission to cloud | Database | |
| | | | edge | cloud |
| 1 | #1 | False | True | False |
| 2 | #2 | True | False | True |
| 3 | | | | |
| 4 | | | | |
| 5 | | | | |
| 6 | | | | |
| | | | | |
| | | | | |

FIG. 7

| # | Channel ID | Subscibe Status | Channel Deserializer |
|---|---|---|---|
| 1 | #1 | False | p1 |
| 2 | #2 | True | p2 |
| 3 | | | |
| 4 | | | |
| 5 | | | |
| | | | |
| | | | |
| | | | |

FIG. 11

METHOD TO MANAGE DATA FLOW FOR EDGE-CORE DISTRIBUTED ANALYTICS SYSTEMS

BACKGROUND

Field

The present disclosure relates generally to Internet of Things (IoT) and more specifically, to management of data flow for edge-core distributed analytics systems.

Related Art

In related art IoT systems, such systems fundamentally provide data gathering functionality and data storing functionality at least. For IoT systems, there is an need to reduce data management cost including network cost and storage cost since the cost effectiveness is one of the keys to facilitating an IoT system.

Related art implementations have been directed to data gathering and storage systems, in particular data transmission and data ingestion. In a related art implementation, a message bus is utilized for decoupling modules, and the system equips such message buses both in the edge and the cloud. Some message buses provide clustering or federation functions natively for data transmission between message buses. The clustering function connects several message buses and acts as one large message bus.

In this case, message exchanges between message buses are executed based on requirements. If transmission volume and costs between the edge and the core are not an issue, then message exchanges can facilitate useful functions. The federation function connects several message buses and exchanges only certain messages that have specific topics or keys as set in advance, which allow it to be a useful function for partially connecting message buses. However, when the operator wants to change the data flows, the operator must change the configuration for the topic or the key manually.

The related art implementations utilize data ingestion software such as log stash and fluentd. Either software can connect the message bus and datalake together, retrieve data from the message bus and store the data in the datalake. Such implementations have the capability to choose messages to be stored while allowing for the selection of the topic or key to be subscribed in configuration file. However, such implementations are static in value; the operator will have to manually change the configuration when the operator wants to change the data flows to the datalake.

IoT systems tend to be developed as an agile development style that is expected to be extended continuously. As such, the importance of data might change at each development stage. For example, at an initial stage, raw sensing data might be important to investigate the effective feature value. But at a more mature stage (e.g., after deploying an analytics module), analytics results may become more important and the raw data may become no longer necessary.

In related art implementations, configurations of the connections between message buses and/or between message bus and datalake is fundamentally static. The amount of data to be transferred and stored increases continuously, which results in an overburden in storage and network costs.

SUMMARY

Example implementations are directed herein to reduce the cost and consumption of storage and traffic for IoT systems, in particular data transmission from edge site to cloud site and data ingestion to the datalake.

Aspects of the present disclosure can involve a method for a system with a plurality of edge nodes connected to a core server, the plurality of edge nodes executing a plurality of analytics processes on data received on the plurality of edge nodes, the method involving, for a receipt of a change or an addition to the plurality of analytics processes, providing a first interface configured to define data channels utilized by the analytics processes corresponding to the change or the addition to the plurality of analytics processes; providing a second interface configured to define data routing corresponding to the change or the addition to the plurality of analytics processes; propagating changes to the data channels based on first modifications received from the first interface to the edge nodes corresponding to the change or the addition to the plurality of analytics; and updating subscriptions to the data channels based on second modifications received from the second interface.

Aspects of the present disclosure include a non-transitory computer readable medium, storing instructions for a system involving a plurality of edge nodes connected to a core server, the plurality of edge nodes executing a plurality of analytics processes on data received on the plurality of edge nodes, the instructions configured to be executed by one or more hardware processors, the instructions involving, for a receipt of a change or an addition to the plurality of analytics processes, providing a first interface configured to define data channels utilized by the analytics processes corresponding to the change or the addition to the plurality of analytics processes; providing a second interface configured to define data routing corresponding to the change or the addition to the plurality of analytics processes; propagating changes to the data channels based on first modifications received from the first interface to the edge nodes corresponding to the change or the addition to the plurality of analytics; and updating subscriptions to the data channels based on second modifications received from the second interface.

Aspects of the present disclosure include a system involving a plurality of edge nodes connected to a core server, the plurality of edge nodes executing a plurality of analytics processes on data received on the plurality of edge nodes, and for a receipt of a change or an addition to the plurality of analytics processes, means for providing a first interface configured to define data channels utilized by the analytics processes corresponding to the change or the addition to the plurality of analytics processes; means for providing a second interface configured to define data routing corresponding to the change or the addition to the plurality of analytics processes; means for propagating changes to the data channels based on first modifications received from the first interface to the edge nodes corresponding to the change or the addition to the plurality of analytics; and means for updating subscriptions to the data channels based on second modifications received from the second interface.

Aspects of the present disclosure further include a system, involving a plurality of edge nodes connected to a core server, the plurality of edge nodes executing a plurality of analytics processes on data received on the plurality of edge nodes; and a processor, configured to, for a receipt of a change or an addition to the plurality of analytics processes, provide a first interface configured to define data channels utilized by the analytics processes corresponding to the change or the addition to the plurality of analytics processes; provide a second interface configured to define data routing corresponding to the change or the addition to the plurality of analytics processes; propagate changes to the data channels based on first modifications received from the first interface to the edge nodes corresponding to the change or the addition to the plurality of analytics; and update subscriptions to the data channels based on second modifications received from the second interface.

BRIEF DESCRIPTION OF DRAWINGS

FIG. 3 illustrates an example of channel management GUI, in accordance with an example implementation.

FIG. 4 illustrates an example of routing management GUI, in accordance with an example implementation.

FIG. 5 illustrates an example of user management table, in accordance with an example implementation.

FIG. 6 illustrates an example of channel management table, in accordance with an example implementation.

FIG. 7 illustrates an example of routing management table, in accordance with an example implementation.

FIG. 11 illustrates an example of the subscribe channel management table, in accordance with an example implementation.

DETAILED DESCRIPTION

Figure 1:
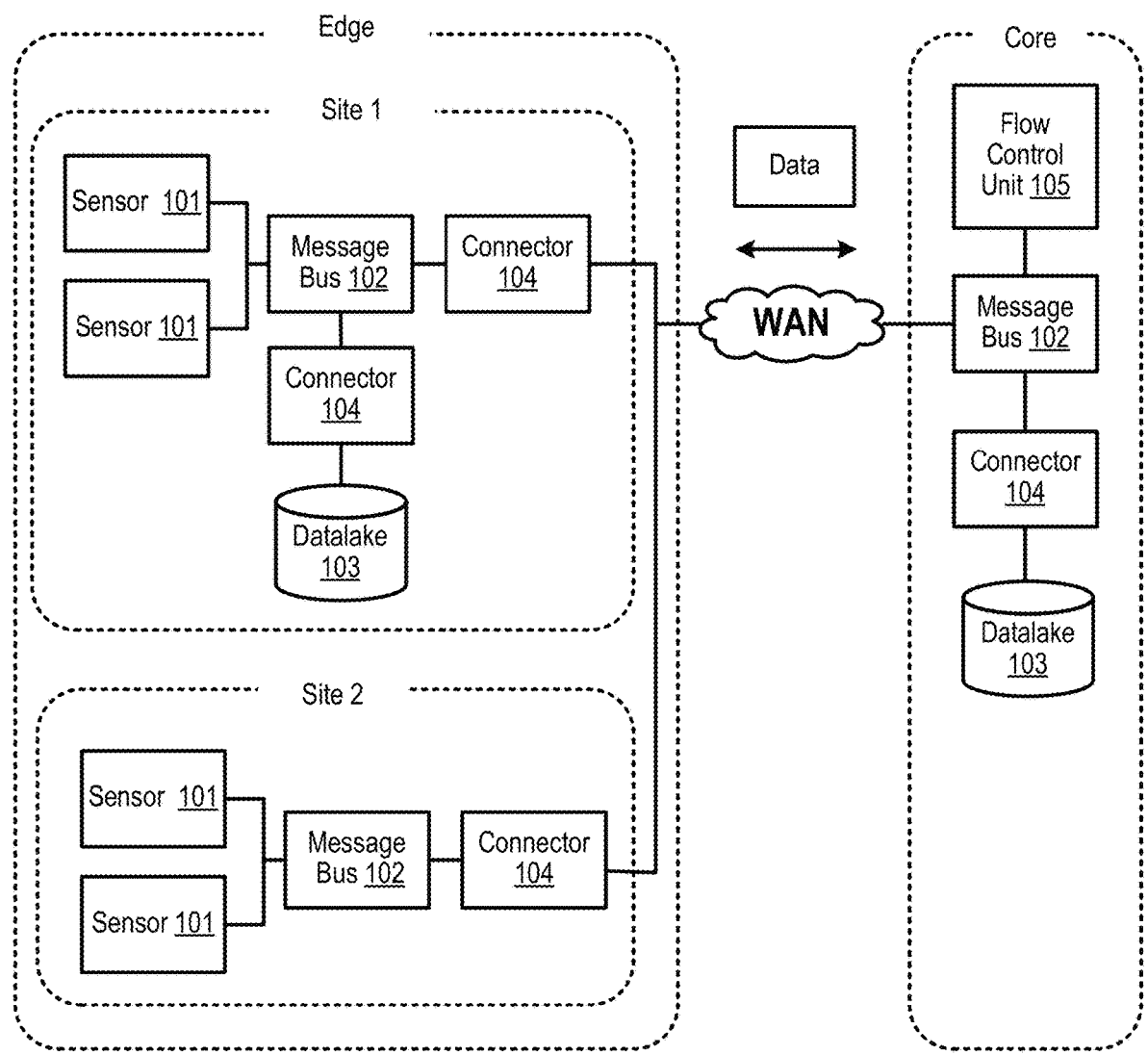
FIG. 1 illustrates an example of a core-edge distributed analytics system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations are directed to facilitating the flexibility of data flows from sensor to datalake through the use of a flow control unit in the core and connectors. The flow control unit manages the overall data flows within the system and controls them dynamically. As a result, it can reduce transmission and storage cost/consumption in accordance with the desired implementation.

In an example implementation described below, the system is configured to manage data flows on the flow control unit to control them properly according to the situation.

FIG. 1 illustrates an example of a core-edge distributed analytics system, in accordance with an example implementation. In this example, there are some sensor nodes 101, message buses 102, a datalake 103 and some connectors 104 in an edge site. In the cloud as a core, there is a flow control unit 105, message bus 102, datalake 103 and a connector 104.

In example implementations, the sensor node 101 senses something, such as temperature, humidity, vibration and so on, and sends the measurements to the message bus 102. The message bus 102 works as an intermediator of message exchanges, and is configured to receive and store data provided by sensors or analytics modules and transmit the results to subscriber clients. The datalake 103 stores the data for future use. The connectors 104 connect message bus 102 to other components, such as core side message bus 102 and datalake 103. The flow control unit 105 controls data flows from source to destination. The edge and the core are connected via wide area network (WAN). Depending on the desired implementation, the datalake 103 can also be optionally removed and deployed on demand basis as shown in the example of Site 2.

The edge nodes or sites as illustrated in FIG. 1 execute a plurality of analytics processes on data received on the edge nodes through using analytics modules (not shown) and can be modified from the core server through flow control unit 105 which can receive changes or additions to the analytics process through instructions by a user or through other methods according to the desired implementation.

Figure 3:
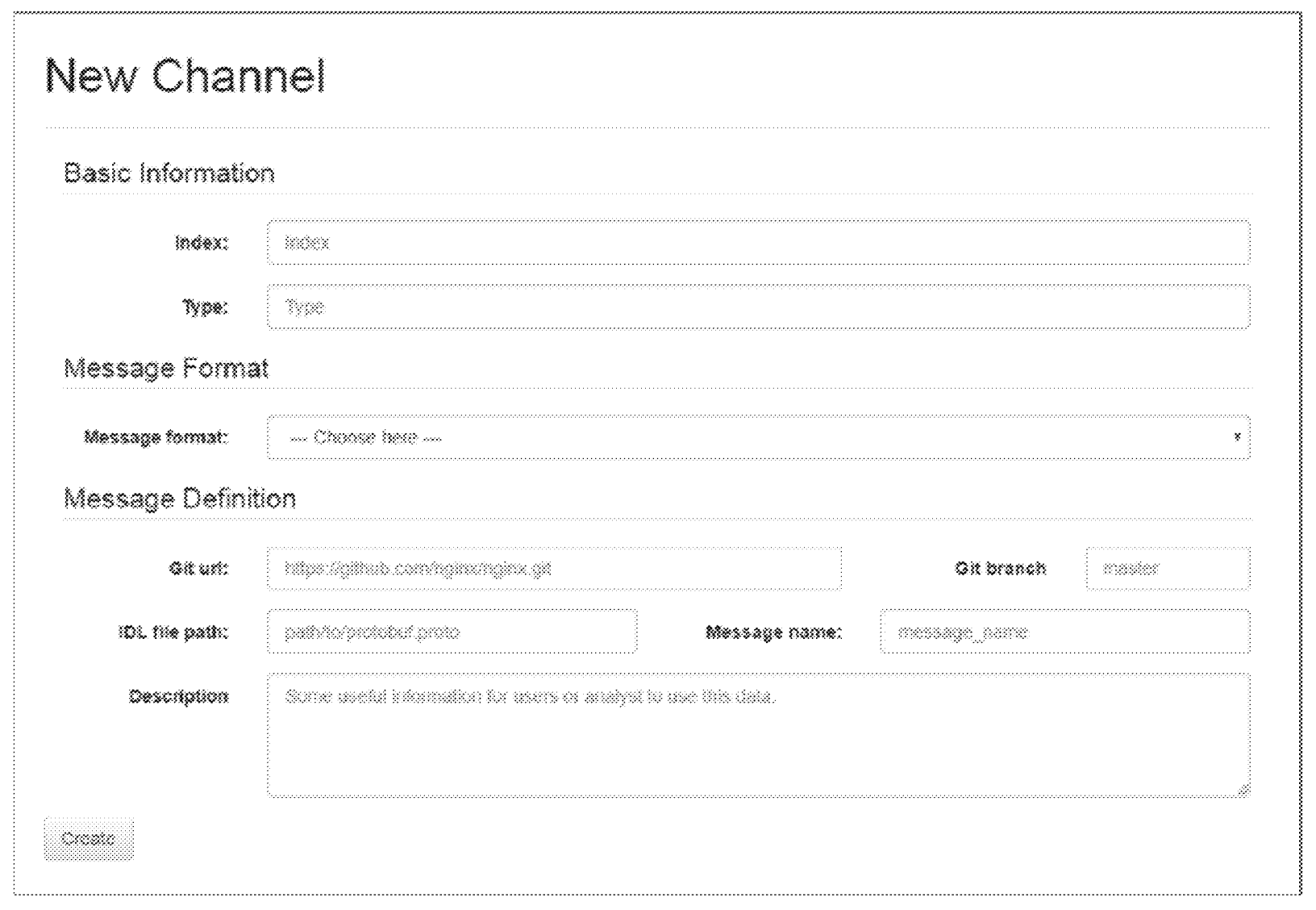
Figure 4:
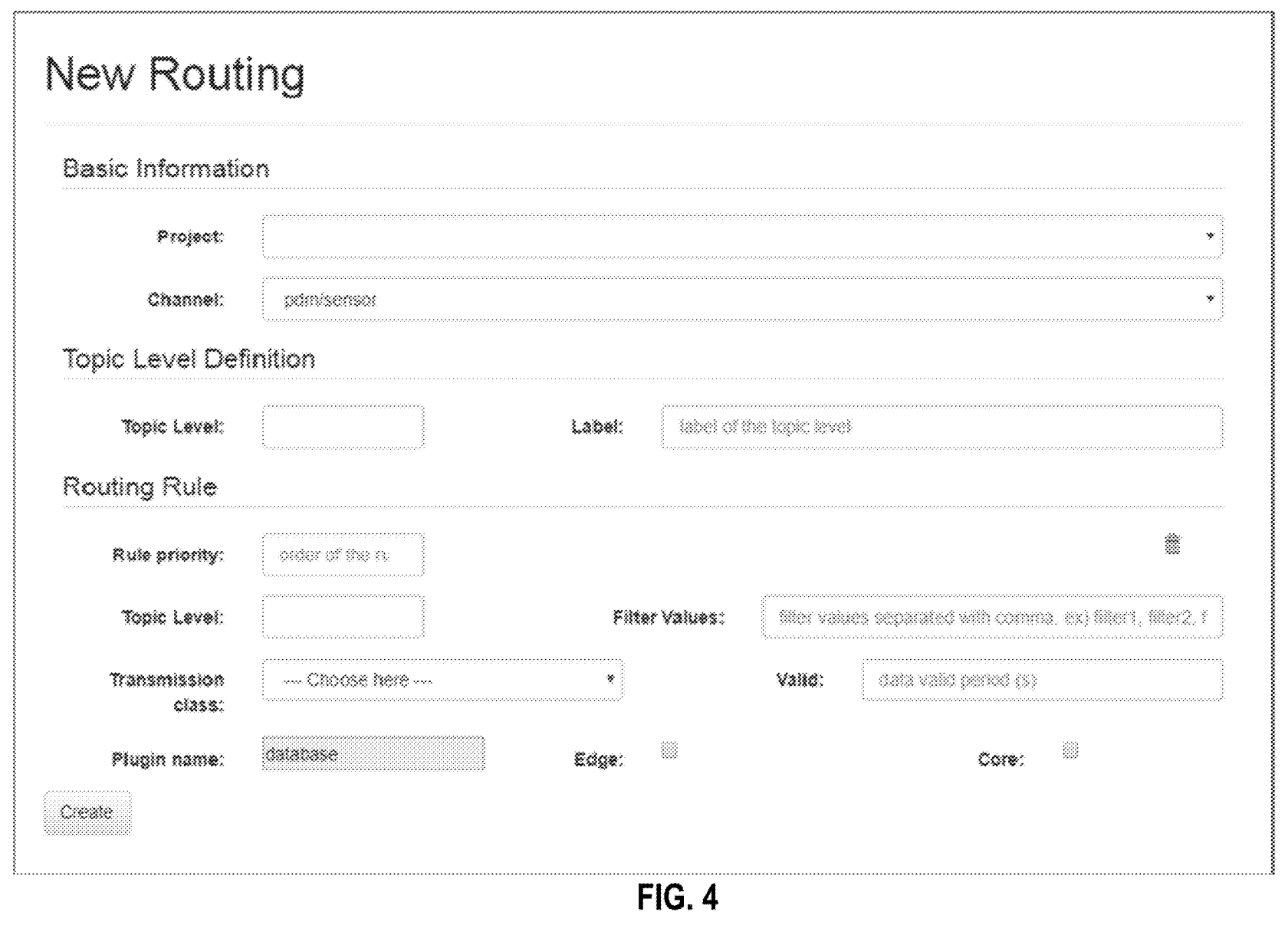
Figure 8:
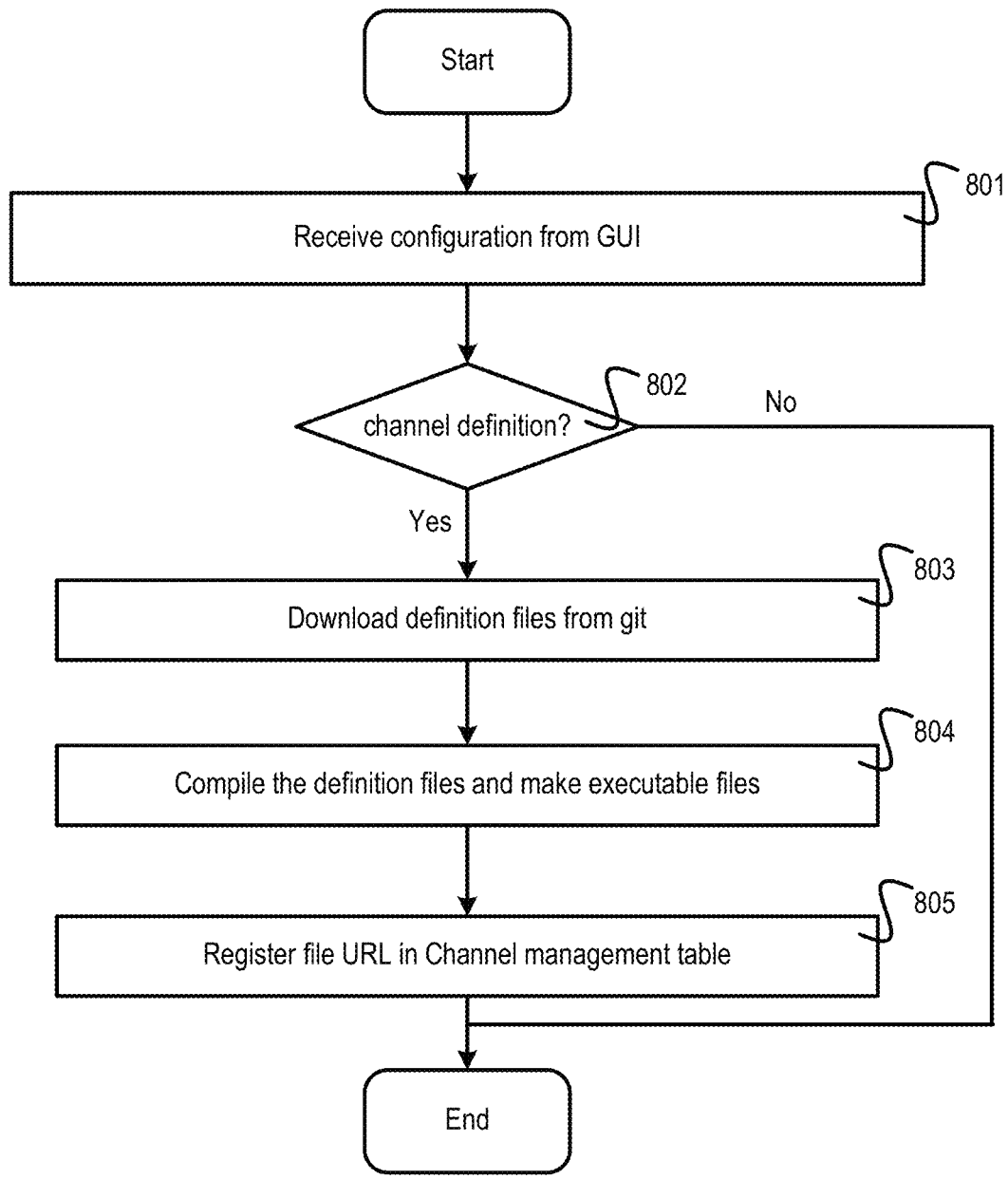
FIG. 8 illustrates an example flow diagram of the channel definition compile program, in accordance with an example implementation.
Figure 12:
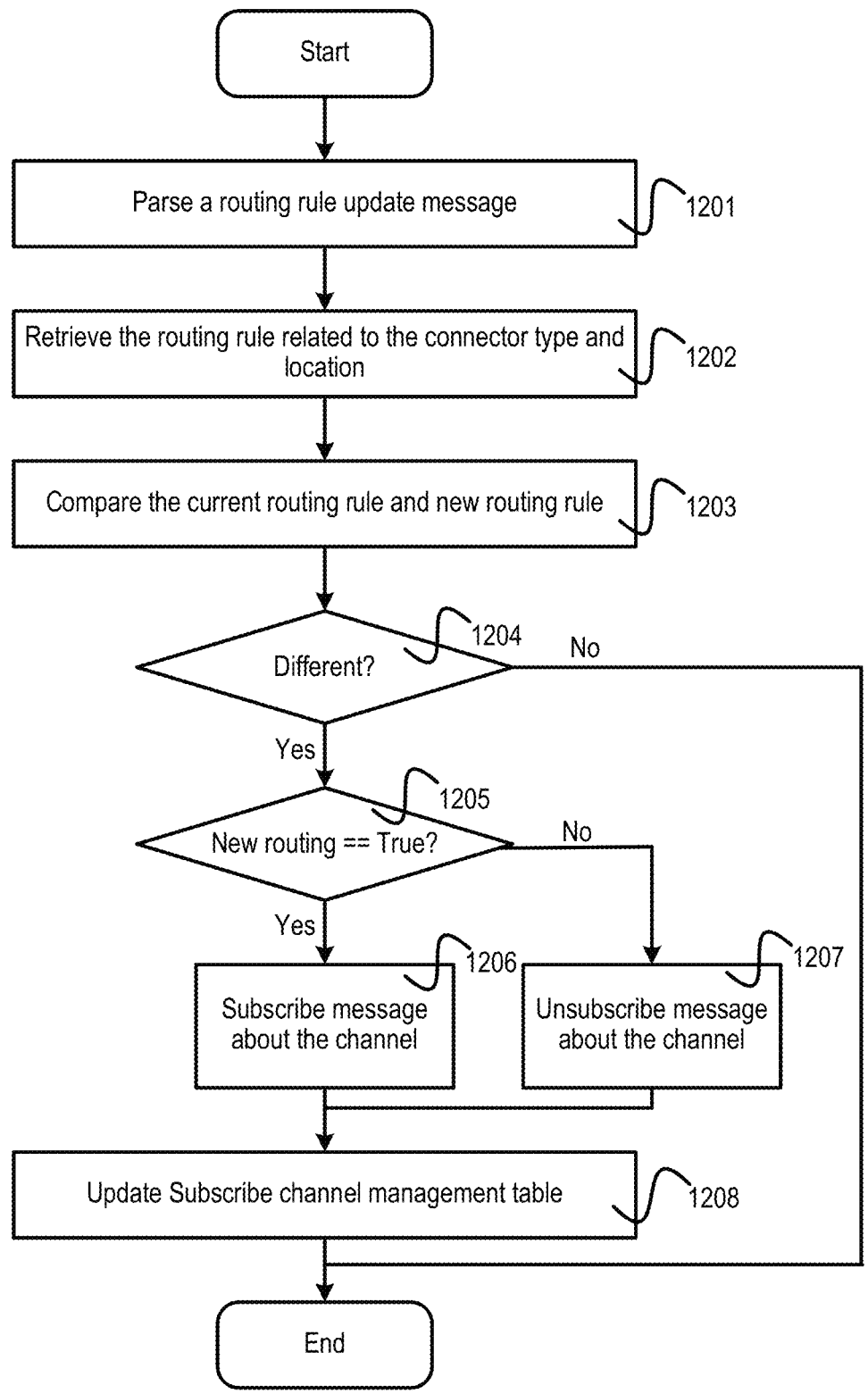
FIG. 12 illustrates an example flow chart of the subscribed channel update program, in accordance with an example implementation.
Figure 13:
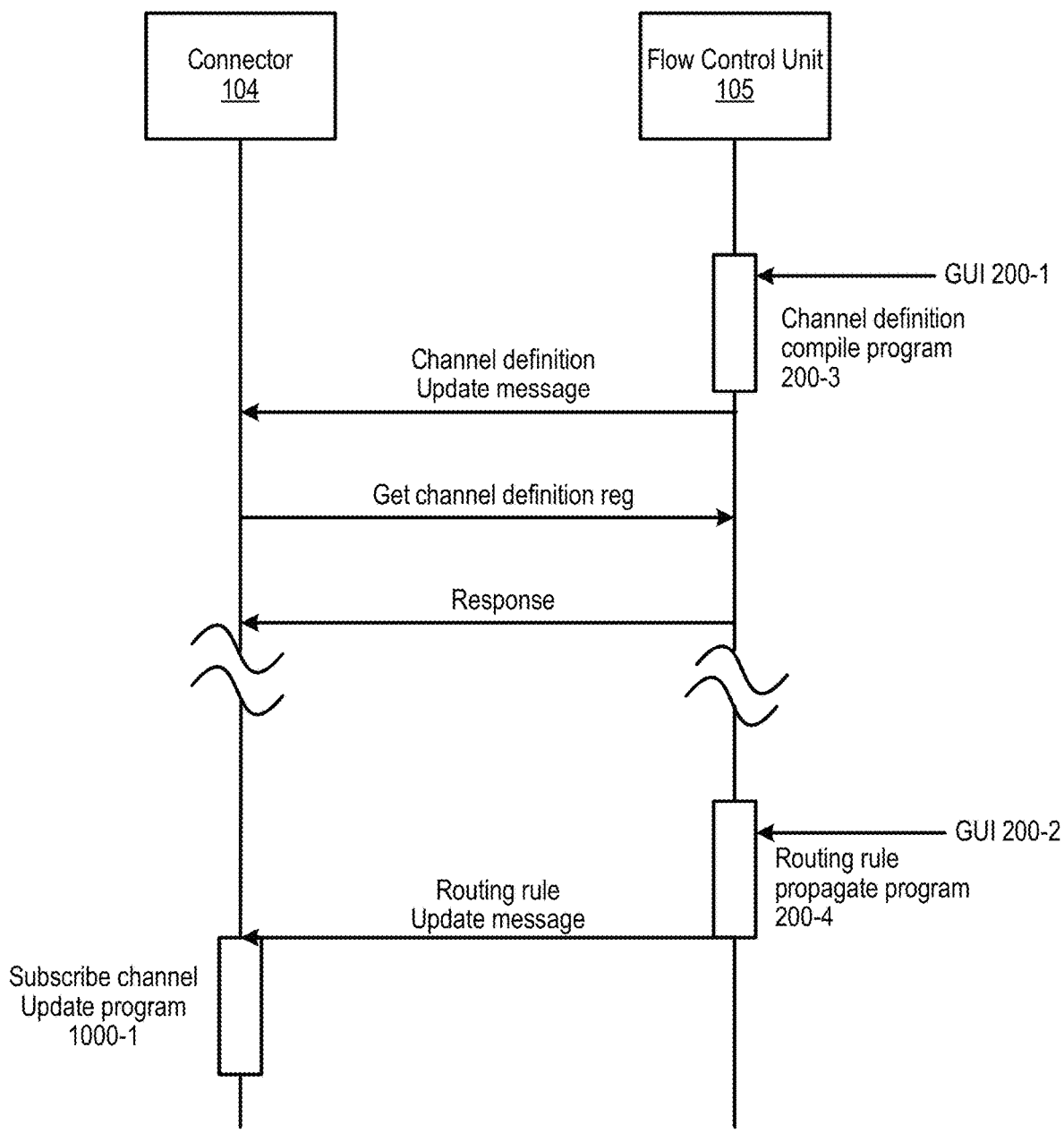
FIG. 13 illustrates an example of a procedure and the associated message format, in accordance with an example implementation.

As described herein, when flow control unit 105 receives a change or an addition to the plurality of analytics processes, flow control unit 105 will provide a first interface configured to define data channels utilized by the analytics processes corresponding to the change or the addition to the plurality of analytics processes as illustrated in FIG. 3; provide a second interface configured to define data routing corresponding to the change or the addition to the plurality of analytics processes as illustrated in FIG. 4; propagate changes to the data channels based on first modifications received from the first interface to the edge nodes corresponding to the change or the addition to the plurality of analytics as illustrated in FIGS. 8 and 13; and update subscriptions to the data channels based on second modifications received from the second interface as illustrated in FIG. 12.

To facilitate example implementations for updating subscriptions to the data channels based on the second modifications received from the second interface, flow control unit 105 can update the subscriptions by generating and transmitting a message to one or more connectors associated with the data channels; for the message indicative of a new routing for the data channels, subscribing the message to the data channels; and for the message not indicative of the new routing for the data channels, unsubscribing the message to the data channels as illustrated in FIGS. 12 and 13.

To facilitate example implementations for propagating changes to the data channels based on the first modifications, the flow control unit 105 can obtain, from a git repository, one or more definition files corresponding to the first modifications; compile the definition files into executable files; and register the executable files to the data channels as illustrated in FIG. 8. Such example implementations can be extended to accommodate additions of new channels and/or new sub-channels in accordance with the desired implementation.

Figure 9:
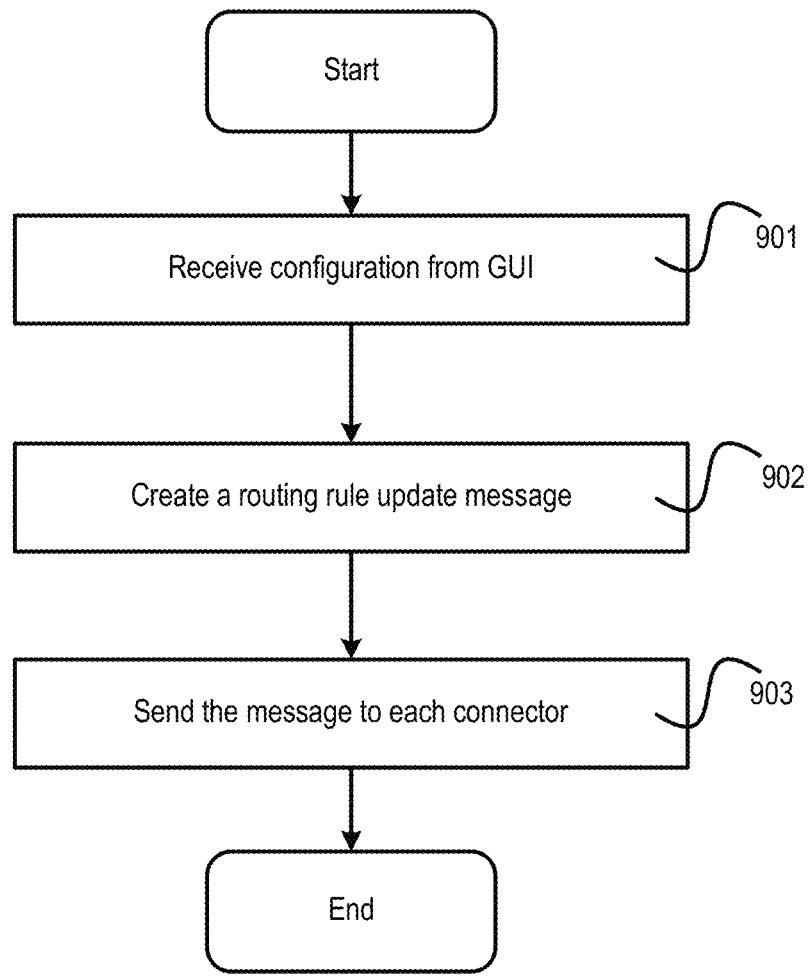
FIG. 9 illustrates an example flow diagram of the routing rule propagate program, in accordance with an example implementation.

Flow control unit 105 can also manage in its memory routing information associating a channel with a corresponding database as illustrated in FIGS. 2 and 5 to 7. Connectors 104 can be configured by the flow control unit 105 to route data from the data channels based on the routing information. Further, the second interface can be configured to define data routing corresponding to the change or the addition to the plurality of analytics processes through facilitating changes to the routing information based on the defined data routing as shown in FIG. 4 and FIG. 9.

Depending on the desired implementation, the data channels can be arranged in a hierarchical manner involving sub-channels. The sub-channels can be utilized to aggregate specific data to a directed analytics module for processing analytics. Such sub-channels can be also be modified by the interface of FIG. 3, and/or new sub-channels can be defined in accordance with the desired implementation.

Through the example implementations described herein, it is possible to control an analytics system through utilizing directed user interfaces at the core server side that can modify the channels of the system as well as the routing at the edge nodes without the need to physically visit the edge nodes to reconfigure their channel and routing information. In example implementations, functionality is facilitated through control of git repositories and connectors through the utilization of two novel interfaces to configure the analytics system in accordance with the desired implementation.

Figure 2:
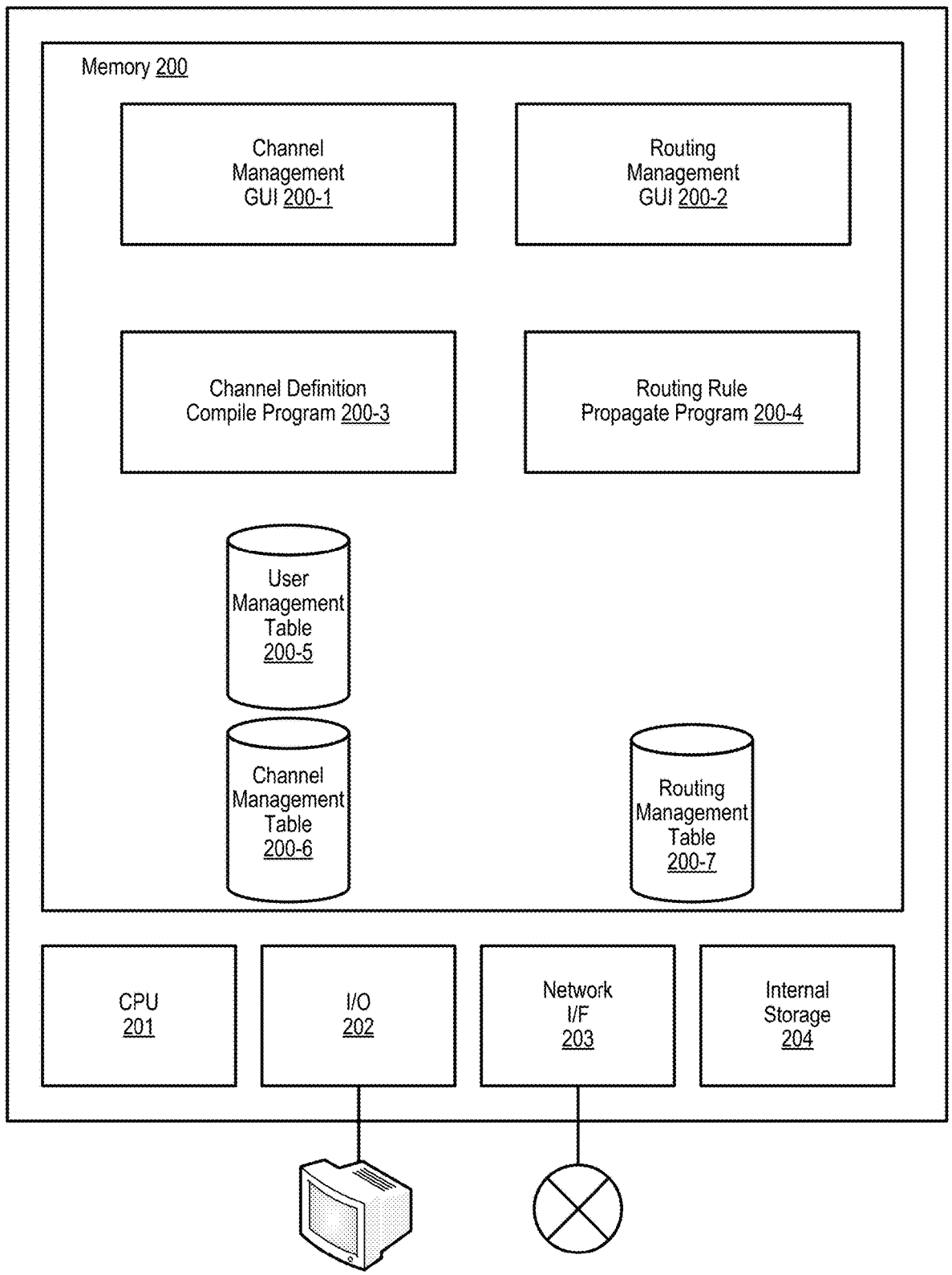
FIG. 2 illustrates example architecture of the flow control unit, in accordance with an example implementation.

FIG. 2 illustrates example architecture of the flow control unit 105, in accordance with an example implementation. Flow control unit 105 involves a memory 200, a central processing unit (CPU) 201, an input/output (I/O) interface 202, a Network interface (I/F) 203, and internal storage 204. CPU 201 may be in the form of one or more hardware processors or a combination of software and hardware processors configured to execute the programs and facilitate the graphical user interface (GUI) stored in memory 200. I/O interface 202 is configured to facilitate inputs and outputs to the flow control unit 105 via an input device such as touch screen, keyboard, mouse, and so on in accordance with the desired implementation. Network I/F 203 facilitates connections between the flow control unit 105 and the WAN. Internal Storage 204 provides additional storage and can also serve as a datalake depending on the desired implementation.

Memory 200 is configured to store channel management GUI 200-1, routing management GUI 200-2, channel definition compile program 200-3, routing rule propagate program 200-4, user management table 200-5, channel management table 200-6, and routing management table 200-7.

The channel definition compile program 200-3 is executed when the operator creates or updates the channel definition via channel management GUI 200-1. The routing rule propagate program 200-4 is executed when the operator creates or updates the routing rule via routing management GUI 200-2. The channel definition created via channel management GUI 200-1 is stored in channel management table 200-6. The routing rule created via routing management GUI 200-2 is stored in routing management table 200-7. Further details of these elements are described herein.

FIG. 3 illustrates an example of channel management GUI 200-1, in accordance with an example implementation. In this GUI, the operator fills out channel information including basic information, message format and message definition. Basic information is a related identifier (ID) to uniquely identify the channel. In this example, there are two layers for the ID, index and type, the combination of which results in a unique ID. Message format indicates the type of messages. In this example, message format can be chosen from raw data, JavaScript Object Notation (JSON), and protobuf (i.e., protocol buffers). Message definition is a pointer to the message definition file stored in a repository such as git. The message definition is use for when the message definition is needed in the message format, such as protobuf. Each field is associated with the field from the channel management table 200-6.

In an example implementation, an operator can fill out the required fields and select the create button, whereupon the channel definition compile program 200-3 executes. After successfully completing the program, the values of such a field are stored in the channel management table 200-6.

FIG. 4 illustrates an example of routing management GUI 200-2, in accordance with an example implementation. In this GUI, the operator fills out routing rule information including basic information, routing rules from edge to cloud, and routing rules from message bus to datalake. Basic information indicates the channel to be controlled. Routing rules include rules such as pass/block, or options such as high/low/block. In such an example, high indicates a routing rule that transfers data as soon as possible and low indicates a routing rule that caches data temporarily and transfers the data after a certain condition is fulfilled.

Each field is associated with the field of the routing management table 200-7. An operator fills out required fields and selects the create button, whereupon the routing rule propagate program 200-4 is executed. After successfully executing the program, the values of those fields are stored in the routing management table 200-7.

FIG. 5 illustrates an example of user management table 200-5, in accordance with an example implementation. Each row of the table indicates account information, such as git account information. The table includes UserID, Domain name, Username and Access token. UserID stores the operator ID of the operator who created a channel definition. Git information includes the domain name, username and access token. The domain name is the domain name of the git repository that stores the channel definition. Username and access token indicate information utilized for accessing the git repository.

FIG. 6 illustrates an example of channel management table 200-6, in accordance with an example implementation. Each row of the table indicates channel information created through channel management GUI 200-1. The table includes channel ID, Message format, and Message definition. In this example, channel ID involves two layers for the channel identifier, index and type. Message format stores the type of messages, such as JSON, protobuf and so on. Message definition stores the pointer to the message definition file in the repository such as the git repository.

FIG. 7 illustrates an example of routing management table 200-7, in accordance with an example implementation. Each row of the table indicates routing information created through routing management GUI 200-2. The table includes channel ID and routing rule. In this example, Channel ID stores the row number of the channel in channel management table 200-6. Routing rule contains multiple columns associated with the connectors, such as a flag for transmission to cloud, and database flag for edge and cloud.

In this example, there are two types of connectors. One is for connecting message buses between edge and cloud, which is indicated by 'Transmission to cloud' column. The other type is for connecting message bus to database, which is associated with the 'Database' column. Deployment location of the connector is also included in the columns such as whether it is in the edge or the cloud. For example, row '#1' indicates the data of channel #1 should be stored in the edge datalake (True) and not be transmitted to cloud side (False).

FIG. 8 illustrates an example flow diagram of the channel definition compile program 200-3, in accordance with an example implementation. The program is executed whenever an operator creates or updates the channel definition via channel management GUI 200-1. This program receives a channel definition from channel definition GUI (Step 801) and checks the message format of the channel (Step 802). If the message format requires a channel definition (Yes), the program proceeds to 803 to execute compiling, otherwise (No) the program ends.

At step 803, the program downloads message definition files from repository (e.g., git repository) by using the user name and token stored in user management table 200-5 as credentials. Next, the program compiles the definition files and generates executable files (Step 804). Then, the program stores files and registers the pointer on file Uniform Resource Link (URL) column in channel management table 200-6.

FIG. 9 illustrates an example flow diagram of the routing rule propagate program 200-4, in accordance with an example implementation. The program is executed whenever an operator creates or updates the routing rule via routing management GUI 200-2. This program receives a routing rule from the routing management GUI (Step 901), then creates a routing rule update message (Step 902). Next, the program sends the message to each connector in the system (Step 903). The message can be sent to each connector via message bus or directly, depending on the desired implementation.

Figure 10:
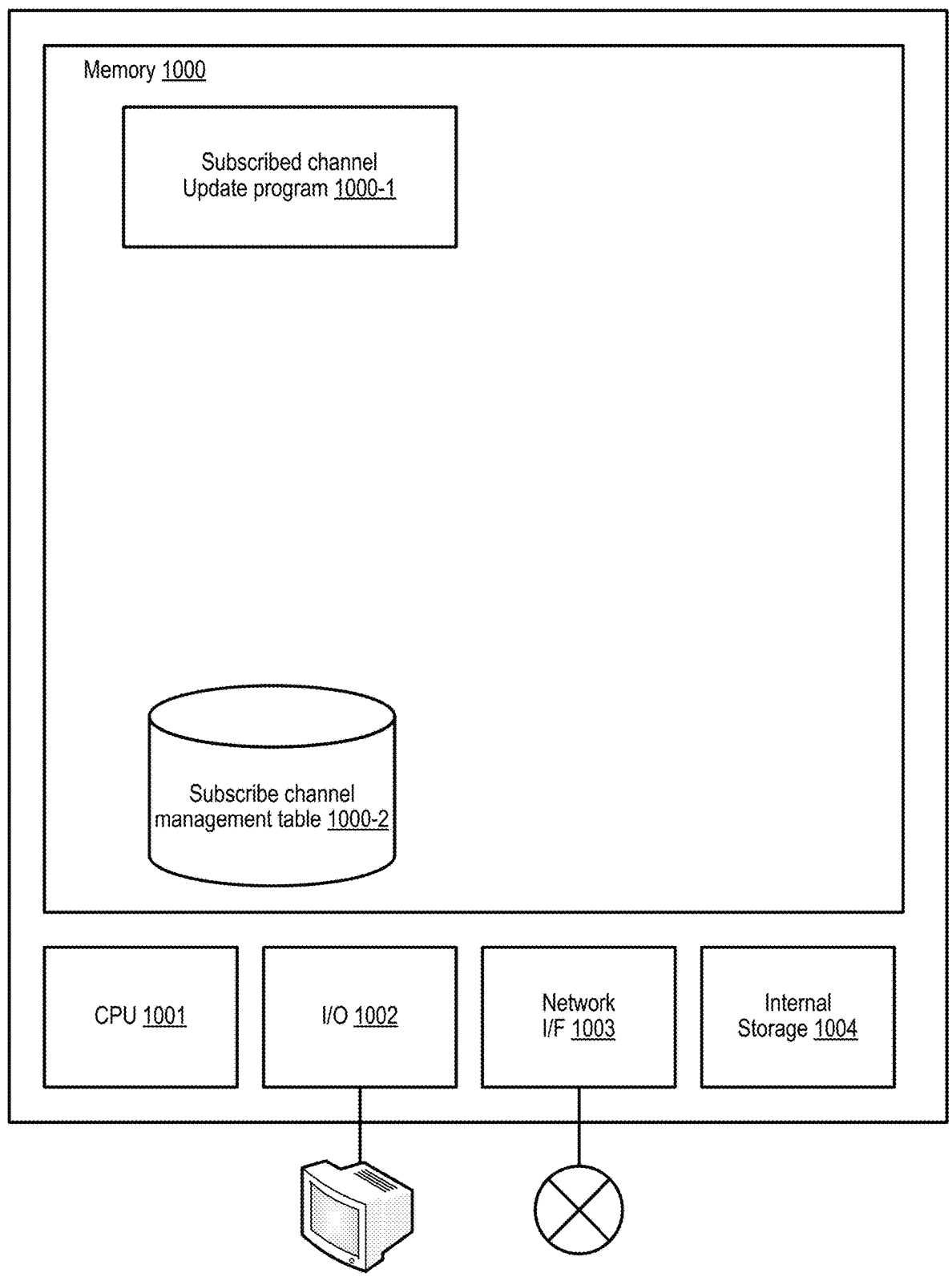
FIG. 10 illustrates an example architecture of a connector, in accordance with an example implementation.

FIG. 10 illustrates an example architecture of the connector 104, in accordance with an example implementation. Similar to flow control unit 105, the connector has a memory 1000, CPU 101, I/O 1002, network I/F 1003, and internal storage 1004. In this example memory 1000 is configured to store subscribed channel update program 1000-1 and subscribe channel management table 1000-2. The subscribed channel update program 1000-1 is executed whenever the connector 104 receives a routing rule update message from flow control unit 105. The subscribed channel update program 1000-1 uses subscribe channel management table 1000-2 in the middle of the process, the details of which are described herein.

FIG. 11 illustrates an example of the subscribe channel management table 1000-2, in accordance with an example implementation. Each row of the table indicates a channel status that is controlled with routing rule update message by flow control unit. The table includes channel ID, subscribe status and channel deserializer pointer. Channel ID stores the channel identifier. In this example, the channel ID indicates the row number of the channel in channel management table 200-6. Subscribe status stores the current status set on the message bus whether the message bus is subscribed or not. Channel deserializer stores the pointer to the executable file to deserialize messages within the channel.

FIG. 12 illustrates an example flow chart of the subscribed channel update program 1000-1, in accordance with an example implementation. The program is executed whenever the program receives a routing rule update message from flow control unit 105.

When this program receives a routing rule update message from flow control unit 105, it parses the routing rule update message (Step 1201) and retrieves the routing rule related to the connector type and location (Step 1202). To facilitate the implementation, the connector type and location of the connector is stored in advance. In the examples described herein, the connector has two types, one for connecting message buses and one for connecting databases. The location of the connector can be at the edge or the cloud.

At step 1203, the program compares the routing rule with new current subscription status from the subscribe channel management table 1000-2. At step 1204, if the values are determined to be different (Yes), then the flow proceeds to steps 1205, otherwise (No), the flow ends.

At step 1205, the program updates the subscription topic (or key) on the message bus by determining if the a new routing rule has been implemented according to the routing rule update message. If so (Yes), then the message is subscribed to the channel at 1206. Otherwise (No) the flow proceeds to 1207 to unsubscribe the message to the channel. At 1208, the subscribe channel management table 1000-2 is updated accordingly.

FIG. 13 illustrates an example of a procedure and the associated message format, in accordance with an example implementation. These procedures are triggered by operator via the GUIs illustrated in FIG. 2. If a channel definition is created/updated, a channel definition update message is sent from the flow control unit 105 to the connector 104 after processing of the channel definition compile program.

The message format for the channel definition update message involves the channel ID 1300 and definition file URL 1301 that is the pointer to download executable files to deserialize the message within the channel. The connector which receives the message retrieves the executable files corresponding to the URL. If a routing rule is created/updated, a routing rule update message is sent from flow control unit to connector after processing of routing rule propagate program. The routing definition update message contains channel ID 1300 and the routing rule 1302 which can involve the same information as the routing management table.

Through execution of the example implementations described herein, the flexibility of data flow management from sensor to cloud, datalake or other system can be effected through management of the overall data flows within the system and facilitating dynamic control over such flows.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a system comprising a plurality of edge nodes connected to a core server, the plurality of edge nodes executing a plurality of analytics processes on data received on the plurality of edge nodes, the method comprising:

for a receipt of a change or an addition to the plurality of analytics processes:
providing a first interface configured to define data channels utilized by the analytics processes corresponding to the change or the addition to the plurality of analytics processes;
providing a second interface configured to define data routing corresponding to the change or the addition to the plurality of analytics processes;
propagating changes to the data channels based on first modifications received from the first interface to the edge nodes corresponding to the change or the addition to the plurality of analytics processes; and
updating subscriptions to the data channels based on second modifications received from the second interface.

2. The method of claim 1, wherein the updating subscriptions to the data channels based on the second modifications comprises:
transmitting a message to one or more connectors associated with the data channels;
for the message indicative of a new routing for the data channels, subscribing the message to the data channels;
for the message not indicative of the new routing for the data channels, unsubscribing the message to the data channels.

3. The method of claim 1, wherein the propagating changes to the data channels based on the first modifications comprises:
obtaining, from a git repository, one or more definition files corresponding to the first modifications;
compiling the definition files into executable files; and
registering the executable files to the data channels.

4. The method of claim 1, wherein for the first modifications indicative of an addition of a new channel, the propagating changes to the data channels based on the first modifications comprises:
obtaining, from a git repository, one or more definition files corresponding to the new channel;
compiling the one or more definition files into executable files; and
registering the executable files to the new channel.

5. The method of claim 1, further comprising managing routing information associating a channel with a corresponding database; wherein the system comprises connectors configured to route data from the data channels based on the routing information;
wherein the second interface is configured to define data routing corresponding to the change or the addition to the plurality of analytics processes through facilitating changes to the routing information based on the defined data routing.

6. The method of claim 1, wherein the data channels comprise sub channels, wherein the first interface is configured to define the sub channels utilized by the analytics processes corresponding to the change or the addition to the plurality of analytics processes.

7. A non-transitory computer readable medium, storing instructions for a system comprising a plurality of edge nodes connected to a core server, the plurality of edge nodes executing a plurality of analytics processes on data received on the plurality of edge nodes, the instructions configured to be executed by one or more hardware processors, the instructions comprising:

for a receipt of a change or an addition to the plurality of analytics processes:

providing a first interface configured to define data channels utilized by the analytics processes corresponding to the change or the addition to the plurality of analytics processes;

providing a second interface configured to define data routing corresponding to the change or the addition to the plurality of analytics processes;

propagating changes to the data channels based on first modifications received from the first interface to the edge nodes corresponding to the change or the addition to the plurality of analytics processes; and updating subscriptions to the data channels based on second modifications received from the second interface.

8. The non-transitory computer readable medium of claim 7, wherein the updating subscriptions to the data channels based on the second modifications comprises:

transmitting a message to one or more connectors associated with the data channels;

for the message indicative of a new routing for the data channels, subscribing the message to the data channels;

for the message not indicative of the new routing for the data channels, unsubscribing the message to the data channels.

9. The non-transitory computer readable medium of claim 7, wherein the propagating changes to the data channels based on the first modifications comprises:

obtaining, from a git repository, one or more definition files corresponding to the first modifications;

compiling the definition files into executable files; and registering the executable files to the data channels.

10. The non-transitory computer readable medium of claim 7, wherein for the first modifications indicative of an addition of a new channel, the propagating changes to the data channels based on the first modifications comprises:

obtaining, from a git repository, one or more definition files corresponding to the new channel;

compiling the one or more definition files into executable files; and registering the executable files to the new channel.

11. The non-transitory computer readable medium of claim 7, further comprising managing routing information associating a channel with a corresponding database; wherein the system comprises connectors configured to route data from the data channels based on the routing information;

wherein the second interface is configured to define data routing corresponding to the change or the addition to the plurality of analytics processes through facilitating changes to the routing information based on the defined data routing.

12. The non-transitory computer readable medium of claim 7, wherein the data channels comprise sub channels, wherein the first interface is configured to define the sub channels utilized by the analytics processes corresponding to the change or the addition to the plurality of analytics processes.

13. A system, comprising:

a plurality of edge nodes connected to a core server, the plurality of edge nodes executing a plurality of analytics processes on data received on the plurality of edge nodes;

a processor, configured to:

for a receipt of a change or an addition to the plurality of analytics processes:

provide a first interface configured to define data channels utilized by the analytics processes corresponding to the change or the addition to the plurality of analytics processes;

provide a second interface configured to define data routing corresponding to the change or the addition to the plurality of analytics processes;

propagate changes to the data channels based on first modifications received from the first interface to the edge nodes corresponding to the change or the addition to the plurality of analytics processes; and update subscriptions to the data channels based on second modifications received from the second interface.

14. The system of claim 13, wherein the processor is configured to update subscriptions to the data channels based on the second modifications by:

transmitting a message to one or more connectors associated with the data channels;

for the message indicative of a new routing for the data channels, subscribing the message to the data channels;

for the message not indicative of the new routing for the data channels, unsubscribing the message to the data channels.

15. The system of claim 13, wherein the processor is configured to propagate changes to the data channels based on the first modifications by:

obtaining, from a git repository, one or more definition files corresponding to the first modifications;

compiling the definition files into executable files; and registering the executable files to the data channels.

16. The system of claim 13, wherein for the first modifications indicative of an addition of a new channel, the processor is configured to propagate changes to the data channels based on the first modifications by:

obtaining, from a git repository, one or more definition files corresponding to the new channel;

compiling the one or more definition files into executable files; and registering the executable files to the new channel.

17. The system of claim 13, further comprising a memory configured to manage routing information associating a channel with a corresponding database; wherein the system comprises connectors configured to route data from the data channels based on the routing information;

wherein the second interface is configured to define data routing corresponding to the change or the addition to the plurality of analytics processes through facilitating changes to the routing information based on the defined data routing.

18. The system of claim 13, wherein the data channels comprise sub channels, wherein the first interface is configured to define the sub channels utilized by the analytics processes corresponding to the change or the addition to the plurality of analytics processes.

* * * * *